US012782000B2

(12) United States Patent
Ekström

(10) Patent No.: US 12,782,000 B2
(45) Date of Patent: Nov. 3, 2026

(54) ELECTRIC GAS HEATER

(71) Applicant: Kanthal AB, Hallstahammar (SE)

(72) Inventor: Jonas Ekström, Hallstahammar (SE)

(73) Assignee: Kanthal AB, Hallstahammar (SE)

( * ) Notice: Subject to any disclaimer, the term of this patent is extended or adjusted under 35 U.S.C. 154(b) by 879 days.

(21) Appl. No.: 18/008,895

(22) PCT Filed: Jun. 10, 2021

(86) PCT No.: PCT/EP2021/065721

§ 371 (c)(1),
(2) Date: Dec. 7, 2022

(87) PCT Pub. No.: WO2021/250215

PCT Pub. Date: Dec. 16, 2021

(65) Prior Publication Data

US 2023/0213239 A1 Jul. 6, 2023

(30) Foreign Application Priority Data

Jun. 11, 2020 (SE) .................................... 2030194-1

(51) Int. Cl.
*F24H 3/04* (2022.01)
*H05B 3/12* (2006.01)
*H05B 3/42* (2006.01)

(52) U.S. Cl.
CPC ............. *F24H 3/0405* (2013.01); *H05B 3/12* (2013.01); *H05B 3/42* (2013.01); *H05B 2203/022* (2013.01)

(58) Field of Classification Search
CPC .. H05B 3/12; H05B 3/42; H05B 3/141; F24H 3/002
See application file for complete search history.

(56) References Cited

U.S. PATENT DOCUMENTS 927,173 A 7/1909 Schleuter
4,233,494 A * 11/1980 Pawlik .................... F24H 3/081 422/174
4,414,023 A 11/1983 Aggen et al.
5,134,684 A 7/1992 Mishou et al.
(Continued)

FOREIGN PATENT DOCUMENTS

EP 2134143 A1 12/2009
EP 2354704 A1 8/2011
(Continued)

OTHER PUBLICATIONS

KANTHAL PM Tubes, Radiant Tubes and Heating Systems, KANTHAL (Year: 2025).*
(Continued)

*Primary Examiner* — Thien S Tran
(74) *Attorney, Agent, or Firm* — Morgan, Lewis & Bockius LLP

(57) ABSTRACT

An electric gas heater (2) comprises a housing (4), a number of thin tubes (16) arranged in a bundle (18) inside the housing (4), an insulation member (20) configured for supporting the number of thin tubes (16) separated from each other and electrically insulated from each other. Individual tubes (16) of the number of thin tubes (16) are of an electric resistance material, and the insulation member (20) comprises a fibrous material.

17 Claims, 3 Drawing Sheets

(56) References Cited

U.S. PATENT DOCUMENTS

| | | | | |
|---|---|---|---|---|
| 5,229,576 | A | 7/1993 | Nakao et al. | |
| 5,278,939 | A | 1/1994 | Boes et al. | |
| 5,473,141 | A * | 12/1995 | Makris | H05B 3/64 373/133 |
| 9,867,232 | B2 | 1/2018 | Mann et al. | |
| 2008/0210348 | A1 | 9/2008 | Goransson et al. | |
| 2009/0304372 | A1 | 12/2009 | Gubler et al. | |
| 2014/0219855 | A1 | 8/2014 | Hattendorf et al. | |
| 2015/0338126 | A1* | 11/2015 | Olsson | F24H 3/081 392/489 |
| 2018/0098385 | A1 | 4/2018 | Mann et al. | |
| 2020/0386443 | A1* | 12/2020 | Schatz | F24H 1/102 |

FOREIGN PATENT DOCUMENTS

| | | | | |
|---|---|---|---|---|
| JP | S54-021642 | A | 2/1979 | |
| JP | S58-177437 | A | 10/1983 | |
| JP | H03-182086 | A | 8/1991 | |
| JP | H04-273990 | A | 9/1992 | |
| JP | 2005-069570 | A | 3/2005 | |
| JP | 2007-524001 | A | 8/2007 | |
| JP | 2014-523967 | A | 9/2014 | |
| JP | 2015-026014 | A | 2/2015 | |
| JP | 2018-041722 | A | 3/2018 | |
| WO | 2014/107132 | A1 | 7/2014 | |
| WO | WO-2019110799 | A1 * | 6/2019 | F24H 9/0057 |

OTHER PUBLICATIONS

Office Action dated Apr. 15, 2025, issued in corresponding Japanese Patent Application No. 2022-575368.

International Search Report and Written Opinion dated Sep. 24, 2021, issued in corresponding International Patent Application No. PCT/EP2021/065721.

Office Action dated Nov. 10, 2025, issued in corresponding Japanese Patent Application No. 2022-575368.

* cited by examiner

ELECTRIC GAS HEATER

TECHNICAL FIELD

The invention relates to an electric gas heater. The invention further relates to a method for heating a gas in an electric gas heater.

BACKGROUND

Electric gas heaters of a through flow type comprising electrically heated tubes, through which gas to be heated is conducted are known.

U.S. Pat. No. 927,173 discloses an electric heater having resistance members constructed of nickel tubes. In a housing a large number of thin walled nickel tubes are mounted through insulation in transverse sheet metal walls. The nickel tubes, through suitably disposed sheet metal strips, are interposed in series forming an uninterrupted conductor for electric current.

U.S. Pat. No. 4,233,494 discloses a throughflow heater for fluids, in particular, an air heater for use in regenerating a carbon-dioxide adsorber in an air-rectification system. Air is pumped from an upper chamber in a cylindrical housing through parallel groups of Ni—Cr steel heating tubes to a lower chamber communicating with a carbon-dioxide adsorber. The tube groups are suspended at their upper ends from respective $Al_2O_3$ ceramic holder plates seated on flanges projecting into respective openings of a carrier plate in turn removably fastened to the inside of the housing. The tubes in each group are connected in series with one another to a voltage source, the lower ends of the tubes in a group being gripped by a form-fitted ceramic spacer slidably inserted into a pipe section aligned in a support plate with an associated opening in the upper carrier plate, thereby ensuring the electrical insulation of the tubes. The holder plates and the openings are shaped as circles or as circular sections.

A different kind of gas heater comprises one or more electrically heated wires extending through a number of tubes arranged in parallel e.g., as disclosed in US 2018/098385. A gas heater of this kind is distinctly different from the above discussed kind of fluid heaters comprising electrically heated tubes. Namely, the tubes through which the electrically heated wires extend have to be electrically insulating. This also means that the tubes can be positioned in abutment with each other in a bundle of tubes. Moreover, the gas is heated primarily by the electrically heated wires and secondarily by the tubes, which are heated indirectly by the electrically heated wires.

In order to ensure proper operation of the electric gas heater it is important that the tubes of an electric gas heater are separated from each other. Therefore, suspension of the tubes of an electric gas heater is complicated and may require intricate suspension arrangements to fulfil both its suspension and electrical insulation requirements.

SUMMARY

It would be advantageous to achieve an improved electric gas heater overcoming, or at least alleviating, at least some of the above-mentioned drawbacks. In particular, it would be desirable to enable an efficient suspension of tubes of an electric gas heater. To better address one or more of these concerns, an electric gas heater having the features defined in the one of the independent claims is provided.

According to an aspect of the invention, there is provided an electric gas heater comprising: a housing, a number of thin tubes arranged in a bundle inside the housing, an insulation member configured for supporting the number of thin tubes separated from each other and electrically insulated from each other, electrical conductors configured for connecting the number of thin tubes with an external electric power supply, and inside the housing an inlet chamber upstream of the number of thin tubes and an outlet chamber downstream of the number of thin tubes. A gas flow path extends from the inlet chamber via insides of the number of thin tubes to the outlet chamber. Individual tubes of the number of thin tubes are of an aluminium oxide forming electric resistance material or of a molybdenum based alloy.

Since the electric gas heater comprises an insulation member configured for supporting the number of thin tubes separated from each other and electrically insulated from each other, the tubes of the number of thin tubes are individually supported in a manner insulated from each other.

The electric gas heater may herein alternatively be referred to simply as gas heater, or heater. The electric gas heater may be utilised for heating gas in an industrial process. The heated gas may for example be utilised in an industrial process, it may be an energy carrier in an industrial process, and/or it may be utilised as a heat source in an industrial process.

The gas heater provides directly electrically heated tubes and thereby direct energized tubes, which are void of any additional heating elements and thus, provide basis for an uncomplicated construction of the gas heater. The gas heater is of a simple construction requiring few different components. Although the heater may comprise hundreds of individual tubes, the tubes may be of a limited number of different kinds. This, inter alia, leads to the gas heater being operationally reliable.

The thin tubes have a small diameter and a thin wall thickness. A large number of tubes may thus be provided in a given volume of the gas heater. Accordingly, the thin tubes provide efficient use of the volume of the housing and thus, efficient heat transfer to the gas to be heated.

Moreover, since the number of thin tubes is configured to be connected to an external electric power supply and since the thin tubes are of an aluminium oxide forming electric resistance material or a molybdenum based alloy, the thin tubes are directly electrically heated. The electric energy thus supplied is efficiently transformed into heat which is transferred to the gas to be heated in the electric gas heater.

The thin tubes provide a flow passage for the gas to be heated. Insides of the thin tubes lack any heat generating members extending therethrough. That is, the insides of the thin tubes are empty meaning that there is nothing therein. They do not have any internal elements, such as wire heating elements, extending therethrough.

Herein, the thin tubes may alternatively be referred to as tubes.

Herein, the number of tubes arranged in a bundle alternatively may be referred to as a bundle of tubes, or simply a bundle. In the bundle, the thin tubes are arranged in parallel at a distance from each other.

The gas heater comprises a housing, inside which the bundle of tubes is arranged, not only protects the bundle of tubes, but may additionally be devised as a pressure vessel. If the housing is devised as a pressure vessel, this means that individual tubes of the number of tubes do not have to be able to withstand any pressure difference between their insides and outsides more than the pressure drop which will be caused by the gas flow. Thus, additionally, no pressure rated tubes are needed.

The external electric power supply may comprise mains power or may be connected to mains power via a transformer for adapting a voltage of electric current supplied to the electric gas heater.

During use of the gas heater, the inlet chamber acts as a manifold for distributing a collective gas stream to the individual tubes. The outlet chamber acts as a manifold for converging gas that has been heated in the individual tubes into one collective gas stream.

The electric resistance material is an electrical conductor. An electric current, when flowing through the electric resistance material, causes the electric resistance material to be heated. As mentioned above, the electric resistance material is an aluminium oxide forming material. The aluminium oxide will form a protective layer and thereby. the number of thin tubes may withstand both high temperatures and other harsh environment conditions and thus, may enable heating of gas to high temperatures. As also mentioned above, the thin tubes are alternatively of a molybdenum based alloy. Such an alloy may be utilised when the gas to be heated is a non-oxidising gas such as hydrogen or nitrogen.

According to embodiments, the insulation member may comprise a fibrous material. In this manner, a comparatively lightweight supporting member for the number of tubes may be provided.

The insulation member which may comprise the fibrous material may be configured for supporting the number of thin tubes separated from each other in the bundle of tubes inside the housing. The insulation member comprising the fibrous material may form the only supporting member of the gas heater for supporting the number of thin tubes in relation to the housing.

Alternatively, the insulation member may comprise a refractory material in a compact form (non-fibrous). The refractory material may comprise aluminium oxide and/or silicon oxide and/or magnesium oxide.

According to embodiments, the insulation member may seal the inlet chamber from the outlet chamber in such a manner that the gas flow path constitutes a main flow path for gas from the inlet chamber to the outlet chamber. In this manner, the insulation member may also perform a sealing task between the inlet chamber and the outlet chamber, and no additional seal may be required between the inlet and outlet chambers.

According to embodiments, the fibrous material may comprise a vacuum formed fibrous material. In this manner, the insulation member may be efficiently produced.

According to embodiments, the vacuum formed fibrous material may be selected from $Al_2O_3$ fibres and/or $SiO_2$ fibres but other ceramic fibres may be used. The insulation member may be configured to withstand temperatures>1400° C., such as e.g. 1650° C. or 1750° C. Thus, the number of thin tubes may be electrically heated to corresponding high temperatures, such as up to 1300° C. The electric gas heater may be configured for heating gas to a maximum temperature of approximately 1250° C.

According to embodiments, the electric resistance material may be an iron-chromium-aluminium (FeCrAl) alloy comprising at least 3 wt % aluminium. Examples but not limited to such materials/alloys are those sold by the company Kanthal under the trademark Kanthal® APMT or Kanthal® APM.

In this manner, the above defined alloy comprising FeCrAl forms inter alia a layer of $Al_2O_3$, which in itself is a very heat resistant oxide. Thus, $Al_2O_3$ will protect the FeCrAl alloy against aluminium depletion when the thin tubes are heated to high temperatures, such as up to 1300° C. or to within a range of 900-1250° C.

Additionally, another advantage with using an aluminium oxide forming material is that $Al_2O_3$ it will not react with and thus, is comparatively resistant to, many different types of gases. A further advantage is that $Al_2O_3$ is not an electrically conductive material. Thus, the tubes may be arranged closer to each other. Also, any $Al_2O_3$ that might come lose from the tubes will not cause any potential problem with short circuiting the tubes. Finally, the tubes made from the FeCrAl alloy will be heat resistant and stable.

Accordingly, the number of tubes may be configured for heating the gas to high temperatures such as e.g., a maximum temperature of the gas of approximately 1150° C. This means that the individual tubes of the number of tubes may be heated even higher such as to a maximum temperature of 1400° C. However, the higher the temperature of the number of tubes, the shorter the operational lifespan of the number of tubes. A maximum temperature of 1300° C. or 1250° C. of the individual tubes may provide a considerably longer operational lifespan of the number of tubes and still may heat the gas to a maximum temperature of 1100-1150° C. e.g., depending on the flow of the gas through the tubes.

Thus, according to embodiments, the number of thin tubes may be configured to be electrically heated up to a temperature of 1300° C. According to alternative embodiments, the number of thin tubes may be configured to be electrically heated up to a temperature of 1250° C., for example up to a temperature within a range of 900-1250° C. It is within these high temperature ranges that the gas heater as discussed herein provides its advantage of being an efficient directly electrically heated gas heater that may be provided in a compact format. However, it should be noted that the number of thin tubes may be heated up to lower temperatures, it will depend on the application and use of the heater.

A molybdenum based alloy may also be used in the present disclosure. An electric current applied to the thin tubes of molybdenum based alloy will cause the tubes to be heated. The alloy is suitable for service temperature up to 1800° C. Molybdenum based alloys have good thermal conductivity, electrical conductivity, low thermal expansion coefficient, high-temperature strength, low vapor pressure, and wear resistance and are also known for having good creep-strength at high temperatures.

According to embodiments, the housing may form a pressure vessel. In this manner, the individual tubes of the number of tubes may not have to be able to withstand any pressure difference between their insides and outsides. Accordingly, the electric resistance material or the molybdenum based alloy may not require any particular pressure difference strength and no pressure rating.

According to embodiments, the housing may comprise a sealable opening sized such that the number of thin tubes arranged in a bundle may be extractable out of the housing as one unit via the opening. In this manner, the bundle of tubes may be easily mounted as one unit inside the housing. Moreover, preassembling the bundle before mounting in the housing may be considerably easier than assembling the bundle in situ, inside the housing. Similarly, after having been operated for its entire lifespan, a bundle inside the housing may easily be exchanged for a new bundle of tubes via the opening.

According to embodiments, depending on the gas composition used and also the pressure of the gas used, the individual thin tubes of the bundle may be arranged for an energy transfer of for example up to 70 $W/cm^3$, or up to 100 $W/cm^3$, or up to within a range of 40-70 $W/cm^3$, or up to within a range of 30-60 W/$cm^3$. In this manner, efficient transfer of energy/heat from the individual tubes to the gas may be achieved.

In particular, in embodiments wherein the resistance material is a FeCrAl alloy, as discussed above, such high energy transfer may be achieved.

According to a further aspect of the invention, there is provided a method for heating a gas in an electric gas heater according to any one of the aspects and/or embodiments as discussed herein. The method comprises steps of:

- supplying a gas to the inlet chamber whereby the gas is conducted along the gas flow path via the insides of the number of thin tubes to the outlet chamber,
- supplying an electric current to the number of thin tubes in order to heat the number of thin tubes,
- continue with conducting the gas along the gas flow path via the insides of the number of thin tubes to the outlet chamber, and
- leading the gas from the outlet chamber.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1A:
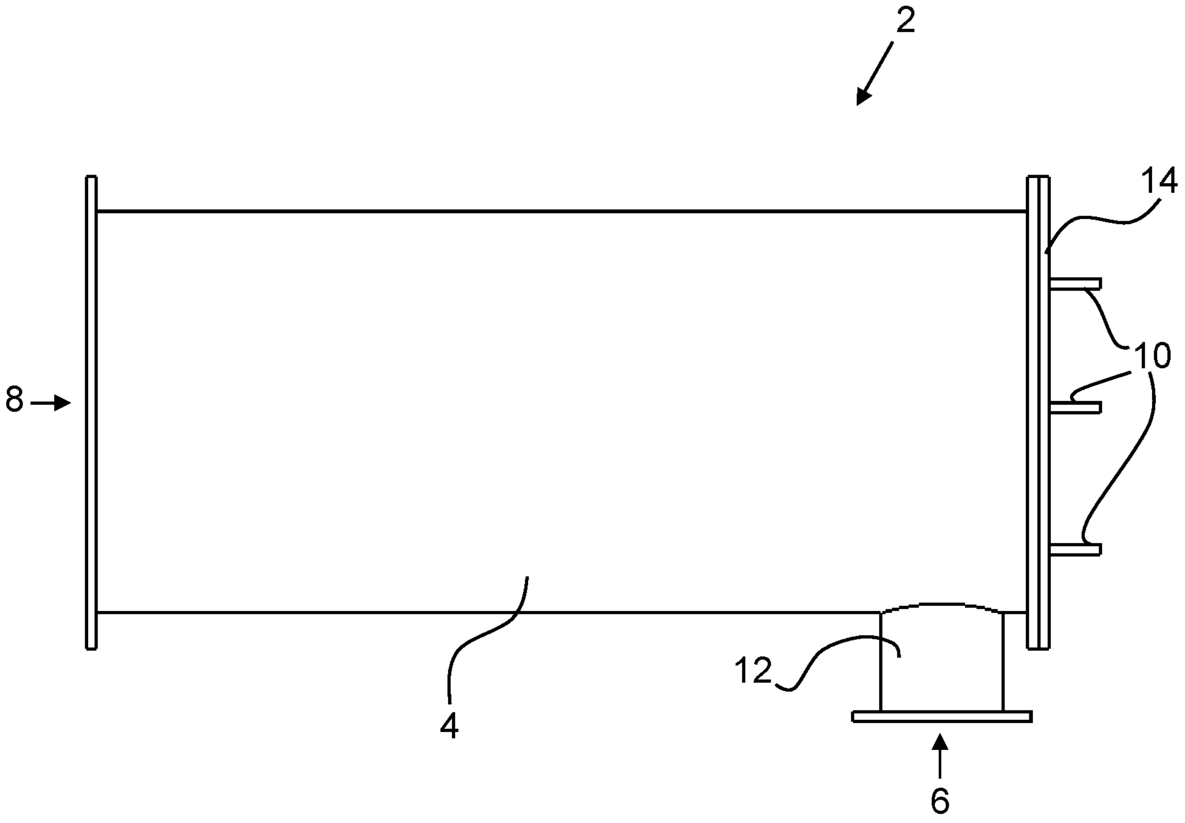
FIGS. 1*a* and 1*b* illustrate two views of an electric gas heater.
Figure 1B:
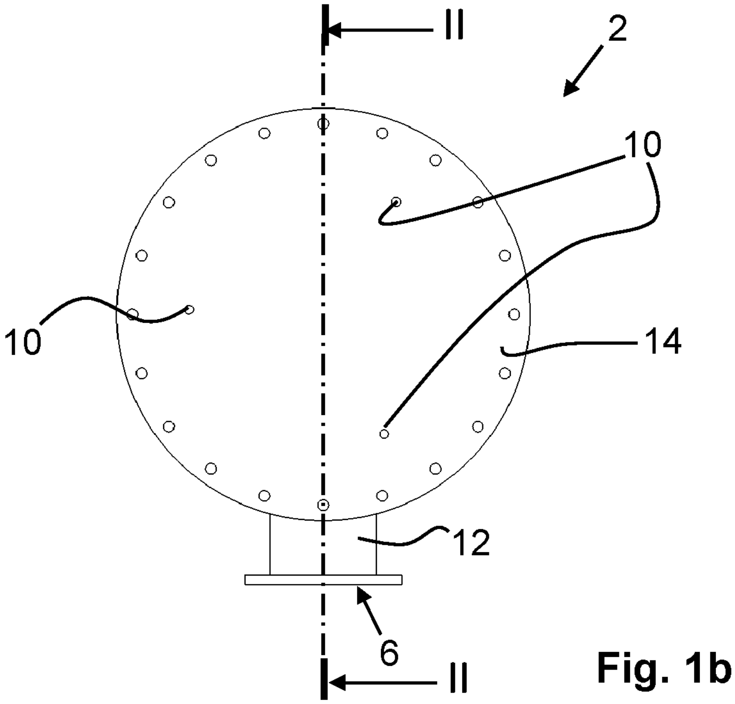

FIGS. 1*a* and 1*b* illustrate two views of an electric gas heater 2 according to embodiments.

The electric gas heater 2 comprises a housing 4. The gas to be heated flows through the housing 4, from an inlet 6 to an outlet 8. The heater 2 further comprises a number of thin tubes arranged in a bundle inside the housing 4, see further below with reference to FIGS. 2-3*c*. Electrical conductors 10 are provided for connecting the number of thin tubes with an external electric power supply.

In the illustrated embodiments, the housing 4 has a tubular shape, the inlet 6 connects radially to the housing 4, and the outlet 8 extends axially from the housing 4. The inlet 6 is provided in an inlet pipe 12 extending radially from the housing 4. The outlet 8 is provided by the tubular housing 4. A lid 14 closes the housing 4 in an axial direction on the inlet side of the housing 4. The electrical conductors 10 extend through the lid 14 in an axial direction of the tubular housing 4.

However, the invention is not limited to the illustrated embodiments. The housing of the gas heater may have any suitable shape for accommodating a bundle of tubes, connecting electrical conductors to the tubes, and permitting a gas flow through the housing. For instance, the inlet may be arranged axially in the same manner as the outlet 8 shown in FIGS. 1*a* and 1*b*, instead of radially and/or the outlet may be arranged radially.

Figure 2:
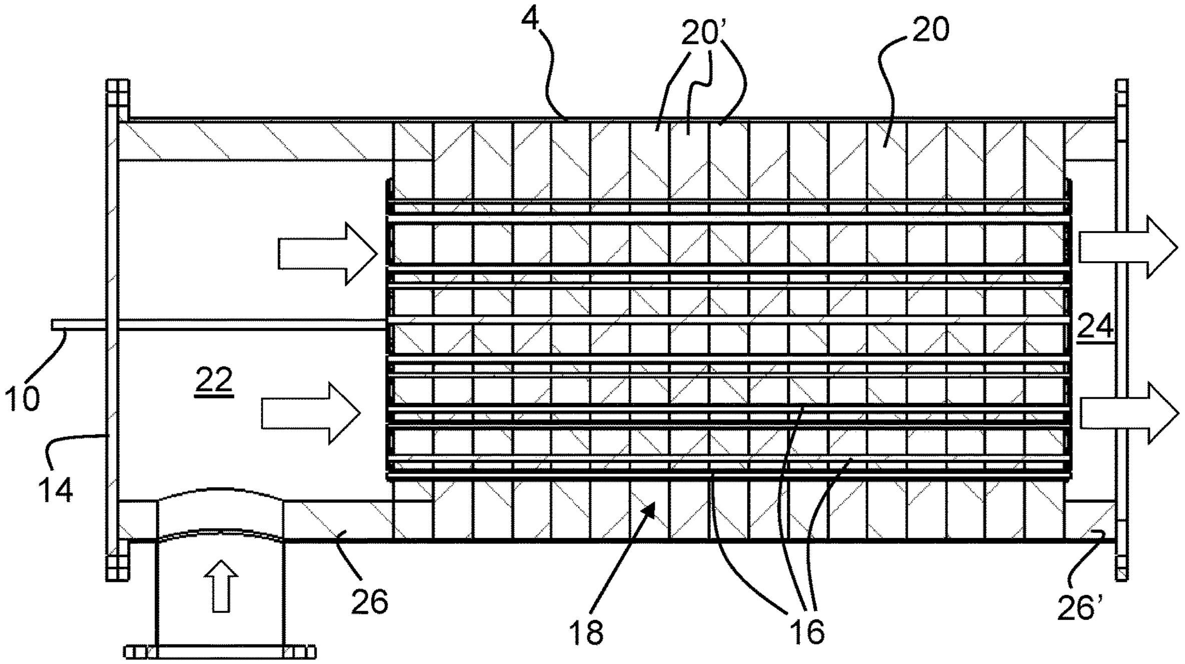
FIG. 2 illustrates a cross sectional view through an electric gas heater.

FIG. 2 illustrates a cross sectional view through the electric gas heater 2 along line II— II in FIG. 1*b*.

In FIG. 2, the number of thin tubes 16 arranged in a bundle 18 inside the housing 4 are clearly shown. The tubes 16 are of an electric resistance material or a molybdenum based alloy. The tubes 16 are directly heated by electric current supplied to the tubes 16 via the electrical conductors 10. When flowing through the electric resistance material or the molybdenum based alloy, the electric current causes the electric resistance material or the molybdenum based alloy to heat up.

The gas heater 2 comprises an insulation member 20 configured for supporting the number of thin tubes 16 separated from each other and electrically insulated from each other. The insulation member 20 also supports the tubes 16 within the housing 4.

In the illustrated embodiments, the insulation member 20 extends substantially along the entire axial length of the bundle 18 of tubes 16. For instance, the insulation member 20 may extend along at least 90% of the length of the tubes 16, such as along the entire lengths of the tubes 16. In this manner, the thin tubes 16 may be securely supported and electrically heated up to high temperatures, at which the strength of the tubes 16 is reduced. Moreover, in this manner the insulation member 20 may insulate an inside of the housing 4 against the heat from the tubes 16.

The insulation member 20 may comprise a number of individual members 20'. In the illustrated embodiments, the individual members 20' are arranged side-by-side abutting against each other. Alternatively, the individual members 20' may be arranged at a distance from each other, or only some of the individual members 20' may abut against each other and some are arranged at a distance from each other. Thus, according to some embodiments, the insulation member 20, as formed by the individual members 20', may extend along at least 50% of the length of the tubes 16.

The insulation member 20 supporting the tubes 16 in this manner provides for the gas heater 2 to be positioned in any required position within an industrial plant.

The insulation member 20 may comprise a fibrous material. The fibrous material provides a comparatively lightweight insulation member 20 for the tubes 16. This may be of importance when the insulation member 20 extends along a substantial portion of the length of the tubes 16, such as e.g. at least 50% of the length of the tubes 16 or even along>90% of the length of the tubes 16.

The fibrous material may comprise a vacuum formed fibrous material.

The vacuum forming process for producing a vacuum formed fibrous material, as such, is known and is therefore not described.

According to one embodiment, the vacuum formed fibrous material after manufacturing may be fully cured, i.e. all fibres of the fibrous material are bound to each other via a binder and no portion of the insulation member 20 contains free fibres. In this manner, it may be ensured that the insulation member 20 is able to support the tubes 16. Also, the holes for the tubes 16 may be easily drilled through the insulation member 20 or individual members 20'.

According to one embodiment, the vacuum formed fibrous material may comprises>40% $Al_2O_3$ fibres with $SiO_2$ fibres in balance and binder residue. Alternatively, the vacuum formed fibrous material may comprises>50% $Al_2O_3$ fibres with $SiO_2$ fibres in balance and binder residue, the vacuum formed fibrous material may comprises>60% $Al_2O_3$ fibres with $SiO_2$ fibres in balance and binder residue.

The vacuum formed fibrous material may be a comparatively lightweight material. A density of the vacuum formed fibrous material may be >250 kg/$m^3$ in order to provide an insulation member configured to support the number of thin tubes 16 therein as well as in the housing 4 of the heater 2. An upper end of a density range may be approximately 500 kg/$m^3$.

As mentioned above, the insulation member 20 may comprise a compact (non-fibrous) refractory material e.g., when a higher weight of the gas heater 2 may be accepted.

Inside the housing 4 there is arranged an inlet chamber 22 upstream of the number of thin tubes 16 and an outlet chamber 24 arranged downstream of the number of thin tubes 16. A gas flow path extends from the inlet chamber 22 via insides of the tubes 16 to the outlet chamber 24. In FIG. 2, the gas flow path is indicated with broad arrows in the inlet and outlet chambers 22, 24 and with narrow arrows in some of the tubes 16.

The inlet chamber 22 may be considered to form a manifold for distributing a collective gas stream to the individual tubes 16. Similarly, the outlet chamber 24 may be considered to form a manifold for converging the distributed gas streams in the tubes 16 back into one collective gas stream. Accordingly, in the gas flow path extending from the inlet chamber 22 to the outlet chamber 24, distributed gas flow paths are provided via the insides of the tubes 16. In the distributed gas flow paths of the insides of the tubes 16, the gas is heated.

According to some embodiments, the inlets of the respective individual tubes 16 may be provided with flow restrictions. That is, an upstream portion of each tube 16 may have a reduced inner diameter in comparison with downstream portions of the tube 16. Namely, at high gas flow, the gas flow is evenly distributed between the individual tubes 16 irrespectively of whether the tubes 16 are provided with flow restrictions or not. However, at low gas flow such flow restrictions may contribute to an even distribution of the gas flow between the individual tubes 16 of the bundle 18 from the inlet chamber 22 into the tubes 16. Thus, in a gas heater wherein during use the gas flow varies over a larger flow range, such flow restrictions may be advantageous.

The insulation member 20 seals the inlet chamber 22 from the outlet chamber 24 to the extent that the gas flow path constitutes a main flow path for gas from the inlet chamber 22 to the outlet chamber 24. Accordingly, the insulation member 20 may not provide a gas tight seal between the inlet and outlet chambers 22, 24. However, the insulation member 20 does provide a sufficiently high pressure drop, i.e. gas flow resistance, such that the gas flowing from the inlet chamber 22 to the outlet chamber 24 will mainly flow through the insides of the tubes 16 instead of outside them. For instance, at least 90% of the gas may flow through the insides of the tubes 16 from the inlet chamber 22 to the outlet chamber 24. A certain flow of gas along the outsides of the tubes 16 may be permitted since also along the outsides of the tubes 16, the gas may be heated. However, along an inner surface of the housing 4 any gas flow should be prevented by the insulation member 20 since there the gas will not be heated. A bad seal along the inside of the housing 4 would permit a portion of the gas to escape unheated along the inside from the inlet chamber 22 to the outlet chamber 24.

Insides of the inlet and outlet chambers 22, 24 may be provided with protective elements 26, 26'. The protective elements 26, 26' may be arranged adjacent to the housing 4 in order to protect the housing 4 from the warm gas in the inlet and outlet chambers 22, 24. According to some embodiments, the protective members 26, 26' may comprise a fibrous material of the same kind as the insulation member 20.

In this context, it may be mentioned that the gas heater 2 is suited to elevate the temperature of already hot gas. For instance, the gas flowing into the inlet chamber 22 may have a temperature within a range of 300-900° C.

Figure 3A:
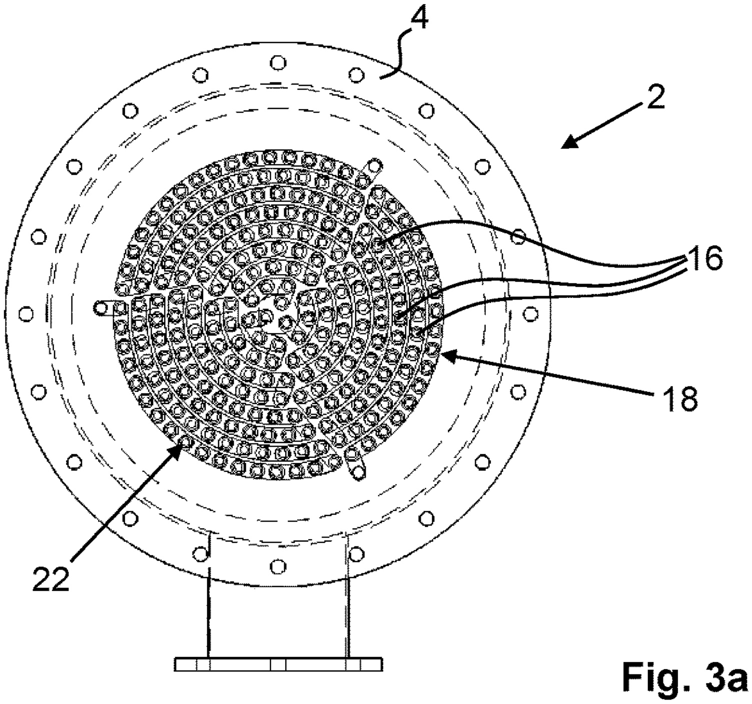
FIGS. 3*a*-3*c* illustrate embodiments of tubes of an electric gas heater and their arrangement in a bundle inside a housing of a gas heater.
Figure 3B:
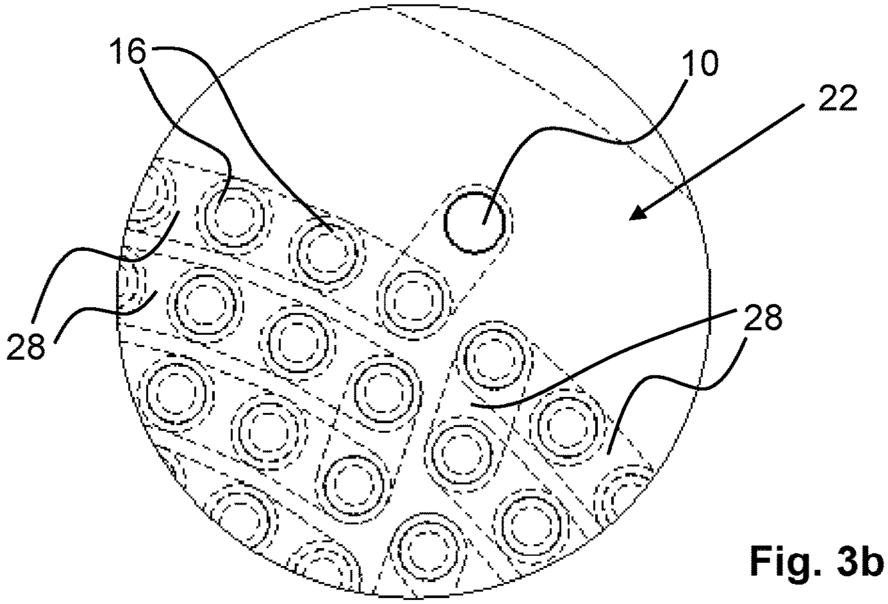
Figure 3C:
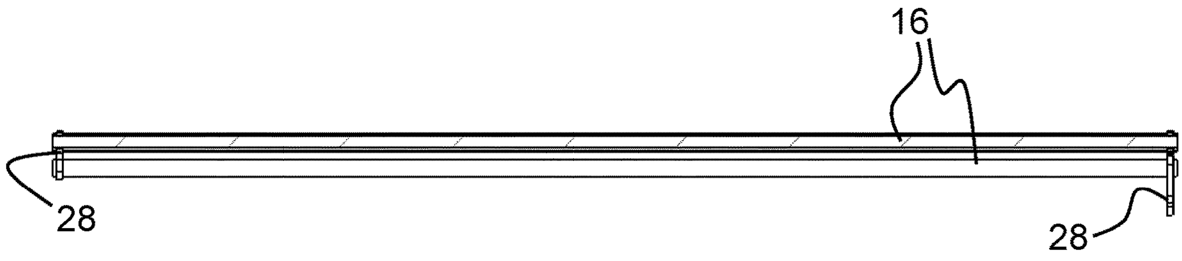

FIGS. 3*a*-3*c* illustrate embodiments of tubes 16 of a gas heater 2 and their arrangement in a bundle 18 inside a housing 4 of a gas heater 2. The gas heater 2 may be a gas heater 2 as discussed above with reference to FIGS. 1*a*-2.

FIG. 3*a* shows a view into an inlet chamber 22 of the heater 2. FIG. 3*b* shows a partial view into the inlet chamber 22. FIG. 3*c* shows two tubes 16.

The gas heater 2 comprises a number of thin tubes 16. Mentioned purely as an example, the number of tubes 16 may be e.g. 50 to 500 tubes, such as 200-300 tubes. The individual tubes 16 of the number of thin tubes 16 are of an electric resistance material or a molybdenum based alloy and are supported and electrically insulated from each other by an insulation member.

The tubes 16 are electrically connected to each other at their end portions via electrically conductive connectors 28. The connectors 28 provide parallel connections between some of the tubes 16 and serial connections between some of the tubes 16. Depending on the voltage connected to the electrical conductors 10 and the electrical resistivity of the individual tubes 16, a suitable configuration of parallel and serial connection between the tubes 16 may be provided.

Via the electrical conductors 10, the tubes 16 are directly or indirectly connected to mains power. For instance, the tubes 16 may be connected to each other in such a manner that mains power at 400 V may be supplied to the tubes 10 via the electrical conductors 10.

The thin tubes 16 have a small diameter and a thin wall thickness.

According to embodiments, individual thin tubes 16 of the bundle 18 may have an inner diameter within a range of 7-30 mm, such as 9-20 mm and a wall thickness within a range of 1-3 mm, such as 1.5-2.5 mm. In this manner, good heat transfer to the gas to be heated may be achieved in the tubes 16 without too large a pressure drop along each of the individual tubes 16.

Due to the insulation member 20 supporting the individual thin tubes 16, the tubes 16 may be of such weak dimensions as exemplified above, even when the lengths of the tubes 16 are long. In particular, this may be the case in embodiments wherein the insulation member 20, as formed by the individual members 20', extend along at least 50% of the length of the tubes 16. Mentioned purely as an example, the length of the individual tubes 16 may be within a range of 0.5-2.5 m, or within a range of 1-2 m.

The electric resistance material is a material that forms at least one heat resistant oxide. As discussed above, the electric resistance material is an aluminium oxide (i.e. alumina) forming alloy.

According to one example, the alumina forming alloy is a FeCrAl alloy comprising at least 3 wt % aluminium. Thus, the tubes 16 may be configured to be electrically heated up to a temperature of 1250° C. while maintaining a practical operational lifespan of the tubes 16.

It is believed that the bundle 18 of tubes 16 may be configured for an energy transfer up to 5 MW/$m^3$ or even higher, according to one embodiment, the energy transfer is within the range of 2 to 5 $MW/m^3$. Namely, the herein discussed electric gas heater 2 provides a space efficient transfer of energy/heat from the tubes 16 of the bundle 18 to the gas to be heat. The space efficiency may be achieved due to the arrangement of the number of thin tubes 16 being supported separated from each other by the insulation member 20. It should be noted that only the volume of the bundle 18 of tubes 16 is included in these energy transfer figures. The volume of the inlet and outlet chambers 22, 24 is excluded.

Purely mentioned as examples, a larger gas heater may be one designed for 5-10 MW with a volume of the bundle 18 of approximately 1.5-2.0 $m^3$, wherein the bundle 18 may comprise several hundreds of tubes 16, which may be arranged within a range of 20-30 mm from each other. A comparatively smaller gas heater may be designed for 0.5-1 MW with a volume of the bundle 18 of approximately 0.2 $m^3$, wherein the tubes 16 within the bundle 18 may be arranged within a range of 10-20 mm from each other. The above-mentioned arrangements of the tubes 16 from each other relates to ranges of distances between the outer diameters of adjacent tubes 16 in the bundle 18.

Within the above discussed distance ranges of 20-30 mm and 10-20 mm, respectively, electric discharge and/or short circuit between the individual tubes 16 is avoided. The voltage applied to the tubes 16 is relevant in the context of the distance between the tubes 16. Generally, the higher the power rating for a gas heater, the higher a voltage is applied to the tubes 16. Thus, the distance range between the tubes 16 is larger for higher power rated gas heaters 2 than for lower power rated gas heaters 2.

According to embodiments, individual tubes 16 of the thin tubes 16 arranged in the bundle 18 may be arranged with outer diameters of adjacent tubes 16 within a range of 10-30 mm from each other.

According to embodiments, individual tubes 16 of the bundle 18 may be arranged for an energy transfer of up to 70 $W/cm^3$, or up to 100 $W/cm^3$, or up to within a range of 40-70 $W/cm^3$, or up to within a range of 30-60 $W/cm^3$.

An efficient transfer of energy/heat from the individual thin tubes 16 to the gas to be heated is achieved in the gas heater 2. The thin tubes 16 may suitable be of the dimension discussed above. Energy transfer in the upper range 100 $W/cm^3$ may come at the cost of a high pressure drop of the gas as it flows through the tubes 16 and may be achieved for some gases, such as hydrogen, and/or under specific operating conditions, which may include one or more of operation under high pressure and/or with a lower outlet temperature e.g. 600 degrees Celsius. More reasonable pressure drop may be achieved at the energy transfer figures within the ranges 40-70 $W/cm^3$ and 30-60 $W/cm^3$. Also these energy transfer figures depend on the gas to be heated and the conditions under which the gas heater 2 is operated.

A different manner of specifying the energy transfer would be to define the energy transfer per area on an inside of the thin tubes 16. For instance, the figure 60 $W/cm^3$ would correspond to approximately 15 $W/cm^2$ in embodiments of the gas heater 2.

The following non-limiting examples relate to gas heaters 2 operated at atmospheric pressure provided with tubes 16 having outer and inner diameters of 17.15 and 12.53 mm and arranged with a centre-to-centre distance of 35 mm. A surface temperature of the tubes 16 of 1250 degrees Celsius is provided and a maximum pressure drop of 100 mBar is allow. The gas heated is air with an inlet temperature of 20 degrees Celsius.

In an embodiment of the above, the gas heater 2 is designed with an outlet temperature of 600 degrees Celsius, an energy transfer of approximately 18 $W/cm^2$ may be achieved. If instead an outlet temperature of 1100 degrees Celsius is provided by the gas heater, only a lower energy transfer of approximately 3 $W/cm^2$ may be achieved. Operating the gas heater 2 under pressure and/or permitting a higher pressure drop will improve these energy transfer figures.

It is thus, easily foreseeable that energy transfer figures within a range of 2-20 $W/cm^2$ may be achieved in the gas heater 2 when operated with air under atmospheric pressure.

The housing 4 may form a pressure vessel. Instead of the individual tubes being able to withstand a pressure difference between their insides and outsides, the housing 4 is devised to withstand a pressure difference between its inside and its outside. Depending on the relevant pressure levels, temperature levels, and type of gas being heated, the housing 4 may comprise low carbon unalloyed, low alloyed, alloyed, or stainless steel, which are suitable for forming a pressure vessel. Moreover, in embodiments wherein the housing forms a pressure vessel, the gas heater 2 may be directly connected to, and utilised in, industrial processes wherein the gas to be heated is pressurised.

Mentioned purely as an example, the pressure vessel may be designed to withstand a gas pressure inside the housing 4 within a range of 10-15 bar, or even up to 30 or 40 bar, depending on the industrial process wherein the heater 2 is used.

Some examples of industrial processes where the gas heater 2 with pressure vessel properties may be utilised are:

Energy storage by means of the heated gas heating a bed of metal or ceramic pellets or beds comprising natural material such as rocks, volcanic rocks, the bed providing a counter pressure to the gas being heated in the gas heater.

Direct reduction of iron pellets with hydrogen or natural gas to produce direct reduction iron, DRI. In this process the high gas temperature achieved in the gas heater 2 may be particularly useful. Gas heated to temperatures within a range of 1000-1100° C. or higher such as up to 1250° C. or up to 1300° C. is advantageous in the direct reduction process. With the present gas heater 2 this is achieved in a gas heater 2 of compact format with high energy density, which is able to heat high gas flows. In the gas heater 2 this is possible due to the use of aluminium oxide forming electric resistance material in the directly electrically heated thin tubes 16, which also lends the gas heater 2 few components and the compact format.

Various chemical processes such e.g. Fischer-Tropsch synthesis.

Use of the heater 2 is not limited to these example processes. Moreover, the heater 2 may be utilised for heating non-pressurised or low pressure gas.

The gas heater 2 is particularly suited for heating large gas flows. Even the above exemplified gas heater being provided with a bundle 18 of tubes 16 having a volume of 0.2 $m^3$ may heat a gas flow of 400-500 $m^3$/hour to temperatures within a range of 900-1250° C. Further, the above exemplified gas heater being provided with a bundle 18 of tubes 16 having a volume of 1.5-2.0 $m^3$ may heat a gas flow of up to 3000 $m^3$/hour to temperatures within a range of 900-1250° C. Even larger flows, such as 15000-20000 $m^3$/hour are foreseen to be heated in larger versions of the gas heater.

For easy mounting, replacement, and servicing of the tubes 16, the housing 4 may comprise a sealable opening sized such that the tubes 16 arranged in a bundle 18 may be extracted out of the housing 4 as one unit via the opening. In the exemplified embodiments, see e.g. FIGS. 1*a* and 2, the opening of the housing 4 is covered by the lid 14 during use of the gas heater 2. The lid 14 seals the opening and is removably attached to the tubular portion of the housing 4, e.g. via nuts and bolts.

If the housing 4 form a pressure vessel and comprises one or more lids 14, as in the exemplified embodiments, see e.g. FIG. 1*a*, the lid 14 must close the housing 4 in a manner to fulfil the requirements of a pressure vessel.

Figure 4:
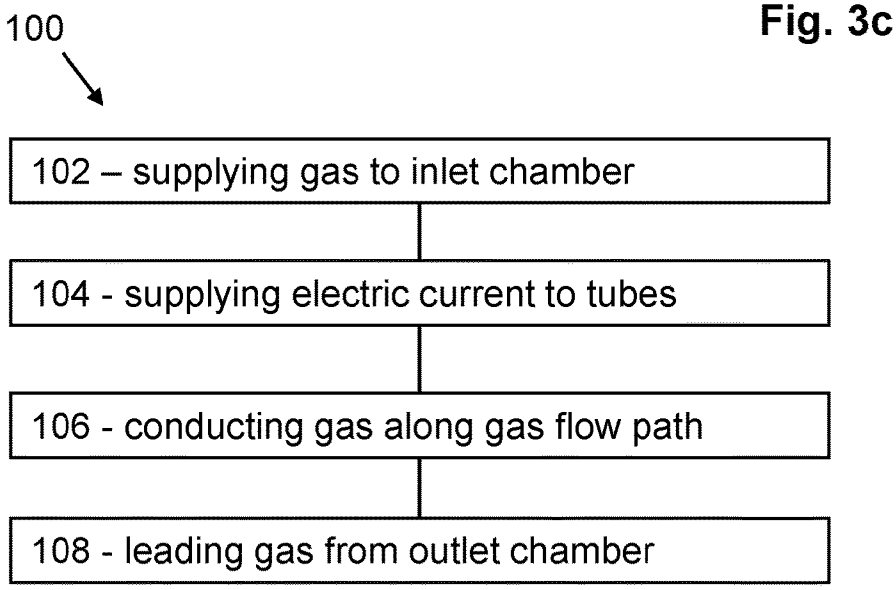
FIG. 4 illustrates a method for heating a gas in an electric gas heater.

FIG. 4 illustrates a method 100 for heating a gas in an electric gas heater 2 according to any one of aspects and/or embodiments discussed herein, such as e.g. the gas heater 2 discussed above with reference to FIGS. 1*a*-3*c*. Accordingly, in the following reference is also made to FIGS. 1*a*-3*c*.

The method 100 for heating a gas in an electric gas heater 2 comprises the steps of:

- supplying 102 a gas to the inlet chamber 22 whereby the gas is conducted along the gas flow path via the insides of the number of thin tubes 16 to the outlet chamber 24,
- supplying 104 an electric current to the number of thin tubes 16 in order to heat the number of thin tubes 16,
- continue with conducting 106 the gas along the gas flow path via the insides of the number of thin tubes 16 to the outlet chamber 24, and
- leading 108 the gas from the outlet chamber 24.

The gas will start to flow as soon as it is supplied to the inlet chamber and thereby it will be conducted along the gas flow path via the bundle of this tubes.

The method 100 may be utilised for heating gas in an industrial process.

According to embodiments of the method 100, the gas may for example but not limited thereto to air, hydrogen, nitrogen, carbon dioxide, synthesis gas, or pyrolysis gases. In this manner, a suitable gas for a relevant industrial process may be heated in the gas heater 2.

According to embodiments of the method 100, the step 102 of supplying a gas to the inlet chamber 22 may comprise supplying the gas at a temperature within a range of 300-900° C. to the inlet chamber 22. In this manner, the property of the gas heater 2 to elevate already hot gas to even higher temperatures may be utilised in an industrial process.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. An electric gas heater, comprising:

- a housing;
- a number of thin tubes arranged in a bundle inside the housing;
- an insulation member configured for supporting the number of thin tubes separated from each other and electrically insulated from each other;
- electrical conductors configured for connecting the number of thin tubes with an external electric power supply; and
- inside the housing, an inlet chamber upstream of the number of thin tubes and an outlet chamber downstream of the number of thin tubes,
- wherein a gas flow path extends from the inlet chamber via insides of the number of thin tubes to the outlet chamber,
- wherein individual tubes of the number of thin tubes are of an aluminium oxide forming electric resistance material,
- wherein the aluminium oxide forming electric resistance material is an iron-chromium-aluminium (FeCrAl) alloy comprising at least 3 wt % aluminium, and
- wherein the number of thin tubes are supported within the housing only by the insulation member,
- wherein the insulation member extends along >50% of a length of the thin tubes, and
- wherein the insulation member directly supports the number of thin tubes within the housing and extends radially from an inner surface of the housing to an outer surface of the number of thin tubes.

2. The electric gas heater according to claim 1, wherein the insulation member seals the inlet chamber from the outlet chamber so that the gas flow path constitutes a main flow path for gas from the inlet chamber to the outlet chamber.

3. The electric gas heater according to claim 1, wherein the insulation member comprises a fibrous material.

4. The electric gas heater according to claim 3, wherein the fibrous material comprises a vacuum formed fibrous material.

5. The electric gas heater according to claim 4, wherein in the vacuum formed fibrous material the fibres are bound to each other via a binder.

6. The electric gas heater according to claim 1, wherein the number of thin tubes are configured to be electrically heated up to a temperature of 1250° C.

7. The electric gas heater according to claim 1, wherein the number of thin tubes are configured to be electrically heated up to a temperature of 1300° C.

8. The electric gas heater according to claim 1, wherein the housing forms a pressure vessel.

9. The electric gas heater according to claim 1, wherein the housing comprises a sealable opening sized such that the number of thin tubes arranged in a bundle are extractable out of the housing as one unit via the opening.

10. The electric gas heater according to claim 1, wherein individual thin tubes of the bundle are arranged for an energy transfer of up to 100 W/cm$^3$.

11. The electric gas heater according to claim 1, wherein individual thin tubes of the bundle have an inner diameter within a range of 7-30 mm and a wall thickness within a range of 1-3 mm.

12. The electric gas heater according to claim 1, wherein individual thin tubes of the thin tubes arranged in the bundle are arranged with outer diameters of adjacent thin tubes within a range of 10-30 mm from each other.

13. A method for heating a gas in an electric gas heater according to claim 1, comprising steps of:

- supplying a gas to the inlet chamber whereby the gas is conducted along the gas flow path via the insides of the number of thin tubes to the outlet chamber;
- supplying an electric current to the number of thin tubes in order to heat the number of thin tubes;
- continue with conducting the gas along the gas flow path via the insides of the number of thin tubes to the outlet chamber; and
- leading the gas from the outlet chamber.

14. The electric gas heater according to claim 1, wherein the insulation member extends along >90% of the length of the thin tubes.

15. The electric gas heater according to claim 1, wherein the number of thin tubes are configured to be electrically heated up to a temperature within a range of 900-1250° C.

16. The electric gas heater according to claim 1, wherein individual thin tubes of the bundle have an inner diameter within a range of 9-20 mm and a wall thickness within a range of 1.5-2.5 mm.

17. The electric gas heater according to claim 1, wherein individual thin tubes of the bundle are arranged for an energy transfer of up to within a range of 40-70 $W/cm^3$.

* * * * *